United States Patent [19]

Kaneko et al.

[11] Patent Number: 5,479,283
[45] Date of Patent: Dec. 26, 1995

[54] FERROELECTRIC LIQUID CRYSTAL APPARATUS HAVING A THRESHOLD VOLTAGE GREATER THAN THE POLARIZATION VALUE DIVIDED BY THE INSULATING LAYER CAPACITANCE

[75] Inventors: Shuzo Kaneko, Yokohama; Ryoji Fujiwara, Chigasaki; Akio Yoshida, Hiratsuka; Tomoko Maruyama, Isehara, all of Japan

[73] Assignee: Canon Kabushiki Kaisha, Tokyo, Japan

[21] Appl. No.: 320,526

[22] Filed: Oct. 11, 1994

Related U.S. Application Data

[62] Division of Ser. No. 746,338, Aug. 16, 1991, Pat. No. 5,396,352.

[30] Foreign Application Priority Data

Aug. 22, 1990 [JP] Japan .................... 2-221709
Aug. 22, 1990 [JP] Japan .................... 2-221710
Jul. 31, 1991 [JP] Japan .................... 3-192048

[51] Int. Cl.$^6$ .................................................. G02F 1/141
[52] U.S. Cl. ............................................ 359/79; 359/100
[58] Field of Search ........................ 359/56, 74, 79, 359/100

[56] References Cited

U.S. PATENT DOCUMENTS

| | | | |
|---|---|---|---|
| 4,738,515 | 4/1988 | Okada et al. | 359/79 |
| 4,770,502 | 9/1988 | Kitazima et al. | 359/50 |
| 4,840,462 | 6/1989 | Hartmann | 350/350 |
| 5,061,044 | 10/1991 | Matsunaga | 359/75 |
| 5,095,376 | 3/1992 | Umeda et al. | 359/50 |
| 5,099,344 | 3/1992 | Tsuboyama et al. | 359/75 |
| 5,113,273 | 5/1992 | Mochizuki et al. | 359/75 |
| 5,126,867 | 6/1992 | Ishiwata | 359/75 |
| 5,136,408 | 8/1992 | Okada et al. | 359/50 |
| 5,227,900 | 7/1993 | Inaba et al. | 359/50 |

FOREIGN PATENT DOCUMENTS

| | | |
|---|---|---|
| 0284134 | 3/1987 | European Pat. Off. . |
| 0367531 | 5/1990 | European Pat. Off. . |
| 02069547 | of 1990 | Japan . |

OTHER PUBLICATIONS

W. Hartmann, Ferroelectric Liquid–Crystal Video Display, Proceedings of the Society for Information Display, vol. 30, No. 2 (1989).

Primary Examiner—Anita Pellman Gross
Assistant Examiner—Tai V. Duong
Attorney, Agent, or Firm—Fitzpatrick, Cella, Harper & Scinto

[57] ABSTRACT

A liquid crystal element includes a liquid crystal exhibiting spontaneous polarization, a pair of electrode substrates for sandwiching the liquid crystal therebetween, and insulating layers formed between the electrode substrates and the liquid crystal. A spontaneous polarization $P_s$ value, in nC/cm$^2$, of the liquid crystal, an interelectrode composite capacitance Ci, in nF/cm$^2$, of the insulating layers, and a voltage threshold value Vth, in volts, of optical response of the liquid crystal in the liquid crystal element satisfy the following condition:

$$\frac{2P_s}{Ci} < Vth$$

2 Claims, 19 Drawing Sheets

(EQUIVALENT CIRCUIT MODEL IN CAPACITY)

(EQUIVALENT CIRCUIT
MODEL IN CAPACITY)

DC COMPONENT 0

DC COMPONENT $V_{sx1}$

DC COMPONENT $V_{sx2}$

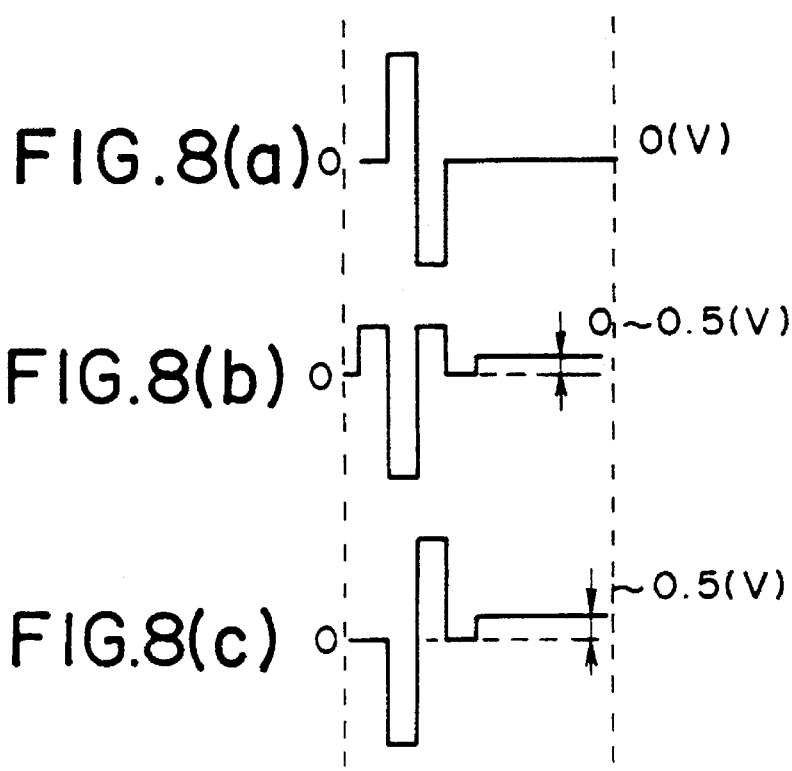
FIG. 8(a)
FIG. 8(b)
FIG. 8(c)
FIG. 9
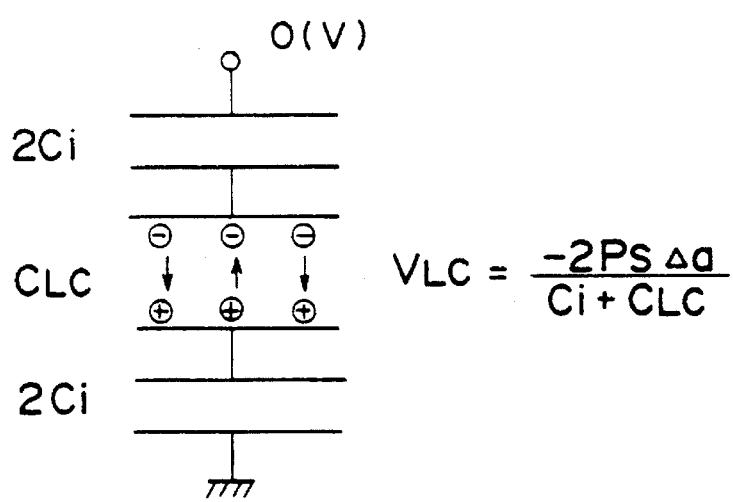
$$V_{LC} = \frac{-2P_S \Delta a}{C_i + C_{LC}}$$

FIG.16(a)  Vsx

FERROELECTRIC LIQUID CRYSTAL APPARATUS HAVING A THRESHOLD VOLTAGE GREATER THAN THE POLARIZATION VALUE DIVIDED BY THE INSULATING LAYER CAPACITANCE

This application is a division of application Ser. No. 07/746,338, filed Aug. 16, 1991, now U.S Pat. No. 5,396,352.

BACKGROUND OF THE INVENTION

1. Field of the Invention

The present invention relates to a liquid crystal apparatus exhibiting spontaneous polarization and, more particularly, to a liquid crystal apparatus using a ferroelectric liquid crystal (FLC).

2. Related Background Art

A ferroelectric liquid crystal (FLC) as a liquid crystal exhibiting the spontaneous polarization has received a great deal of attention in favor of advantages such as high-speed response and good memory characteristics and has been actively developed to obtain a light bulb and the like. Targets utilizing the above advantages are an optical shutter array, a high-definition display unit by simple matrix driving, a light bulb for high-density recording combined with a photoconductive body. In addition, the ferroelectric liquid crystal is expected to display a motion picture by active matrix driving using thin film transistors (TFTs). These characteristics are disclosed in U.S. Pat. No. 4,840,462, the Proceeding of the SID, Vol. 30/2, 1989 "Ferroelectric Liquid Crystal Video Display", and the like.

In driving of the FLC, the following problems are posed generally or found to be caused as a result of experiments conducted by the present inventors.

One of the problems is a decrease in response speed of the liquid crystal when a direct current (DC) component is continuously applied to the FLC for a long period of time due to the following reason. Localization of internal ions in the liquid crystal is assumed to be induced to form an electric field.

To solve this problem, the present applicant made a proposal (Japanese Patent Application No. 2-69547) for canceling a DC component by an auxiliary pulse. In addition, since an FLC has spontaneous polarization, an electric field is formed by internal ions localized in correspondence with this spontaneous polarization, and a desired gradation image becomes unstable. It is found that hysteresis occurs in optical response to an external voltage value (applied voltage value).

The phenomenon occurring upon application of a reset pulse and a write pulse continuously to the FLC at a drive frequency of about a television rate (60 Hz) will be described with reference to FIGS. 20 to 22.

In consideration of the problems found in the above experiments, in order to stably obtain a gradation image (gradation display) at a television rate in the FLC optical response, the present inventors have made further extensive studies in detail.

SUMMARY OF THE INVENTION

It is an object of the present invention to provide a liquid crystal apparatus suitable for gradation display.

It is another object of the present invention to provide a liquid crystal apparatus for realizing improved gradation display by using both an active matrix drive scheme using TFTs and a liquid crystal exhibiting spontaneous polarization, such as a ferroelectric liquid crystal.

According to the first aspect of the present invention, there is provided a liquid crystal apparatus comprising a pair of electrodes, a liquid crystal panel having a liquid crystal arranged between the pair of electrodes and exhibiting spontaneous polarization, first means for applying a gradation voltage signal corresponding to gradation information to the pair of electrodes, and second means for applying, a DC component serving as a reverse bias for an internal electric field generated upon application of the gradation voltage signal, to the liquid crystal during one vertical scanning period.

According to the second aspect of the present invention, there is provided a liquid crystal element comprising a liquid crystal exhibiting spontaneous polarization, a pair of electrode substrates for sandwiching the liquid crystal therebetween, and insulating layers formed between the liquid crystal and the pair of electrode substrates, wherein the following condition is established between a spontaneous polarization $P_S$ value of the liquid crystal, an interelectrode composite capacitance $C_i$ of the insulating layers, and a threshold voltage value $V_{th}$ of an optical response of the liquid crystal in the liquid crystal element:

$$\frac{2P_S}{C_i} < V_{th}$$

BRIEF DESCRIPTION OF THE DRAWINGS

FIG. 8, consisting of FIGS. 8(a)–(c) is a waveform chart showing drive signals used in the cell of the present invention;

FIG. 9 is an equivalent circuit diagram showing a polarization state in the cell used in the present invention;

FIG. 16(a) to 16(d) are waveform charts of drive signals used in the present invention;

DETAILED DESCRIPTION OF THE PREFERRED EMBODIMENTS

Figure 17:
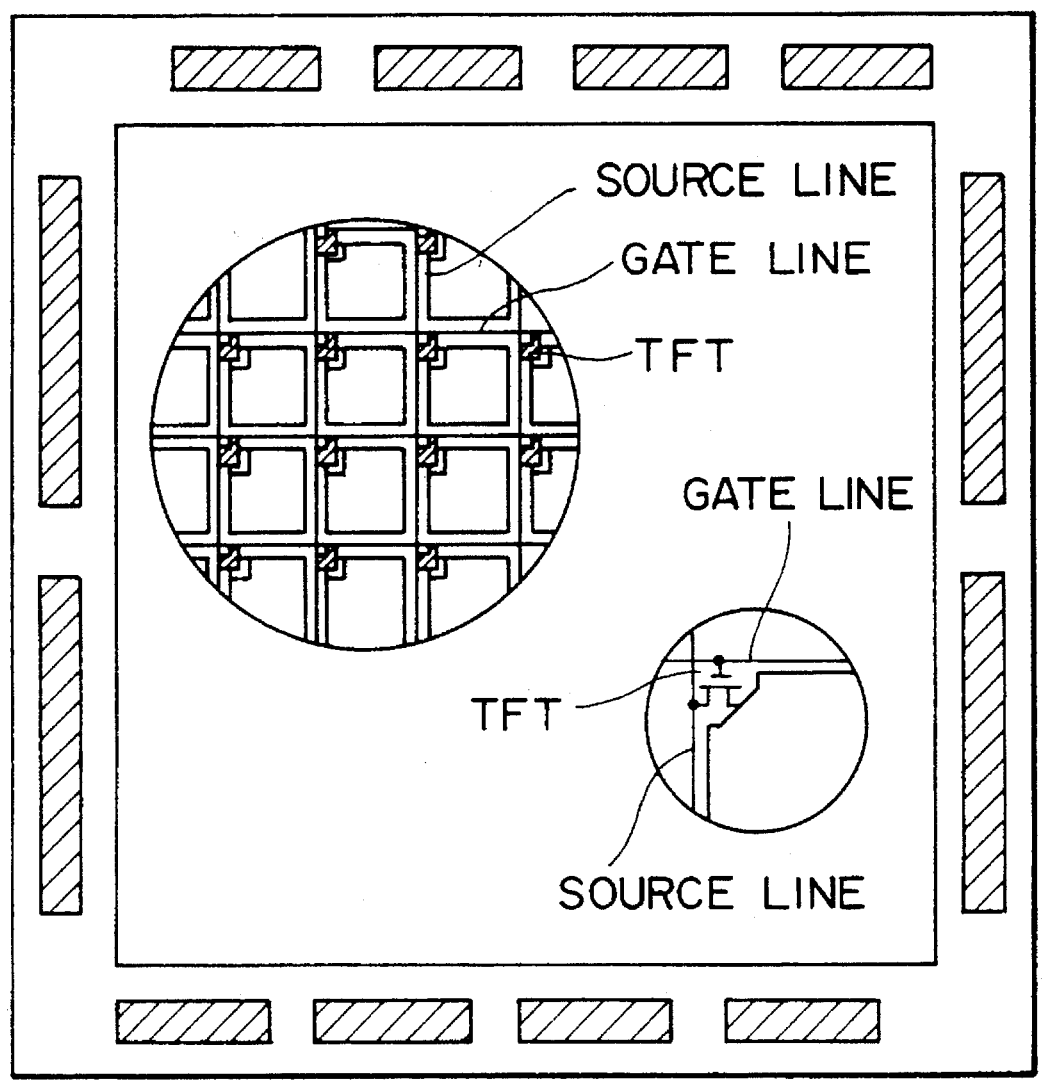
FIG. 17 is a plan view of a panel.

A liquid crystal panel used in the present invention is a liquid crystal panel of an active matrix drive scheme, as shown in FIG. 17. The liquid crystal panel comprises switching elements (TFTs obtained by using thin film semiconductors such as amorphous silicon and polysilicon) arranged along a plurality of rows (scanning lines) and a plurality of columns (data lines), first wiring lines (gate lines) commonly connecting the first terminals (gates) of the switching elements in units of rows, second wiring lines (source lines) connecting the second terminals (sources) of the switching elements in units of columns, a plurality of pixel electrodes (transparent electrodes) connected in units of third terminals (drains) of the switching elements, counter electrodes (transparent electrodes) arranged to oppose the pixel electrodes, and a liquid crystal (chiral smectic C, H, I, G, F liquid crystal exhibiting ferroelectric properties) exhibiting spontaneous polarization and arranged between the plurality of pixel electrodes and the counter electrodes.

The distance between each pixel electrode and the corresponding counter electrode is set to be a minimum distance (about 5 μm or less) capable of sufficiently suppressing formation of a helical structure of the chiral smectic liquid crystal. However, the formation of the helical structure need not be suppressed in the present invention.

Thermal control may be performed during driving of the liquid crystal to maintain the liquid crystal within a desired temperature range.

As shown in FIGS. 1(a) to 1(e), after a reset voltage signal $V_R$ and a recording voltage signal $V_W$ which are applied to a pixel for a predetermined period of time required to cause an optical change of the pixel, an auxiliary voltage signal $V_{SX}$ having a magnitude corresponding to that of the recording voltage signal $V_W$ is applied, thereby controlling an internal electric field to be described below.

In order to describe the auxiliary voltage signal in more detail, the internal electric field generated by ionic localization caused by the DC component spontaneous polarization will be described below.

Figure 2A:
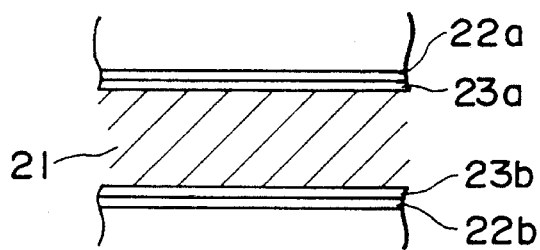
FIG. 2A is a sectional view of a cell used in the present invention.
Figure 2B:
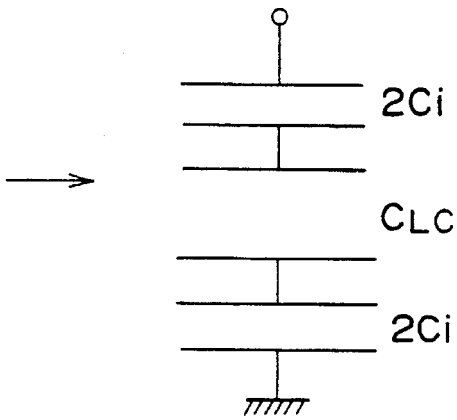
FIG. 2B is an equivalent circuit diagram of the cell.
Figure 3:
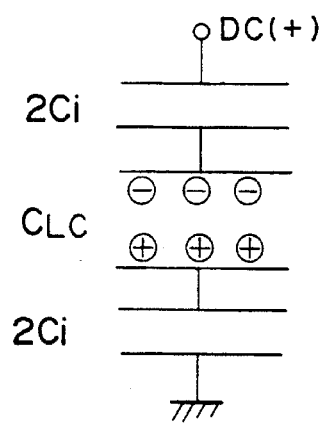
FIGS. 3 to 5C are diagrams showing polarization states in the cell of the present invention.

FIGS. 2A and 2B show a pseudo equivalent circuit model of an FLC element. FIG. 3 shows an ionic localization diagram obtained when an external DC component is applied for a long period of time. When a positive external DC component is applied, it is assumed that ionic localization indicated by ⊕ and ⊖ occurs inside the liquid crystal layer. At this time, if the upward direction $$\left( \uparrow \begin{smallmatrix} \delta+ \\ \delta- \end{smallmatrix} \right)$$

of spontaneous polarization ($P_S$) of the liquid crystal indicates that the liquid crystal corresponds to a black state, an electric field is generated so that the liquid crystal molecules tend to be displayed in black by this ionic localization.

Figure 4A:
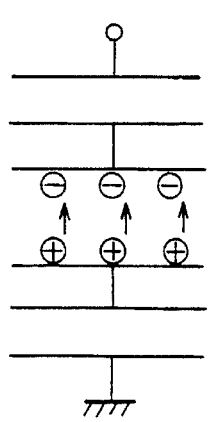
Figure 4B:
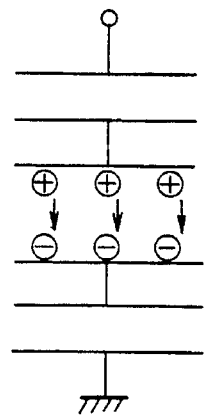

FIGS. 4A and 4B show ionic localization by spontaneous polarization (PS) itself. When the direction of the spontaneous polarization ($P_S$) is kept in the "black"

$$\left( \uparrow \begin{smallmatrix} +\delta \\ -\delta \end{smallmatrix} \text{ Upward} \right)$$

state, the ionic localization in FIG. 4A is obtained. However, when the direction of the spontaneous polarization ($P_S$) is kept in the "white"

$$\left( \downarrow \begin{smallmatrix} +\delta \\ -\delta \end{smallmatrix} \text{ Downward} \right)$$

state, the ionic localization in FIG. 4B is obtained. As a result, the ions generate an electric field. When a new external voltage $V_W$ equal to the previous voltage is applied, depending on whether the liquid crystal state has been kept in the "black" or "white" state for a long period of time, the degree of ease in change of the ionic localization to the "white state" varies, thus causing the hysteresis in the optical response. In addition, instability occurs when the same display state is repeatedly refreshed.

The function of the present invention will be described in more detail with reference to the waveforms of the drive signals in FIGS. 1(a) to 1(e).

Although the number of ions induced by spontaneous polarization is difficult to control, the DC component can be controlled by an external voltage applied to the liquid crystal. According to the present invention, the auxiliary voltage $V_S$ serves as a DC component, and the ionic localization is kept "constant" regardless of the state of the spontaneous polarization $P_S$. The term "constant" indicates a total amount of ionic localization. The "constant" value may be a predetermined value or zero. However, the "constant" value need not always be zero.

A method of adjusting the ionic localization to be "constant" will be described with reference to FIGS. 5A to 5C. For a example, a total amount of ionic localization is apparently maintained to be an amount with which the "black" state as shown in FIG. 4A is kept set.

Figure 1A:
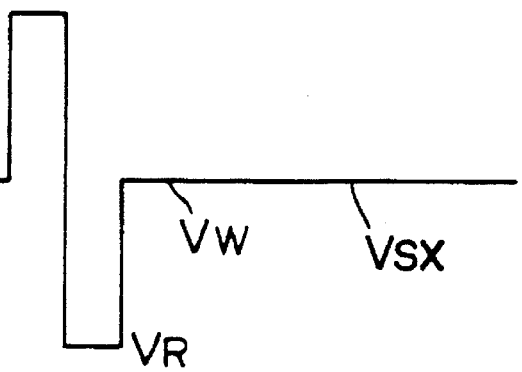
FIGS. 1(a) to 1(e) are waveform charts of drive signals used in the present invention.
Figure 1B:
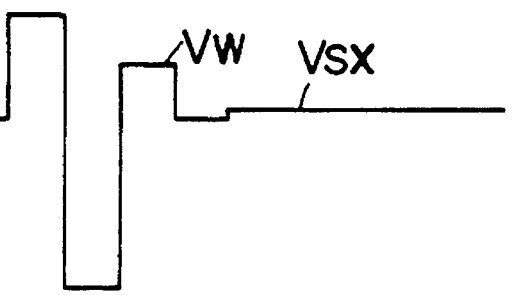
Figure 1C:
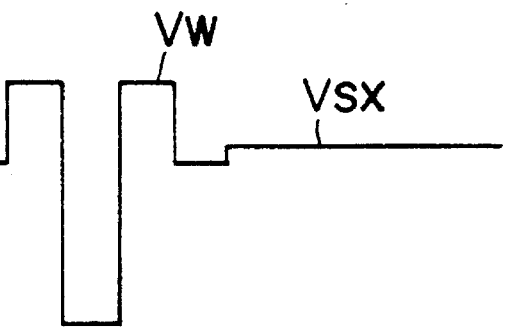
Figure 1D:
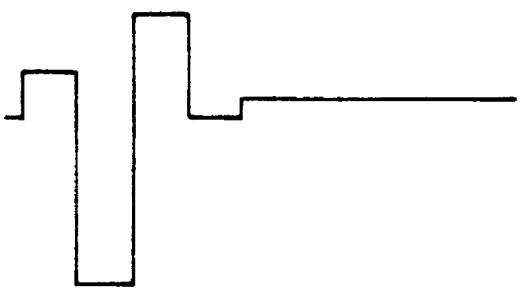
Figure 1E:
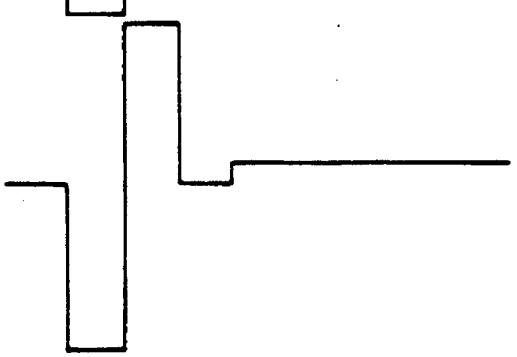
Figure 5A:
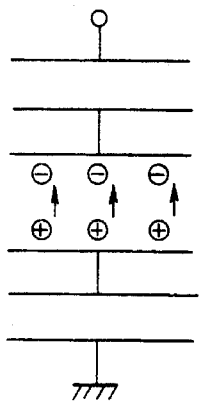
Figure 5B:
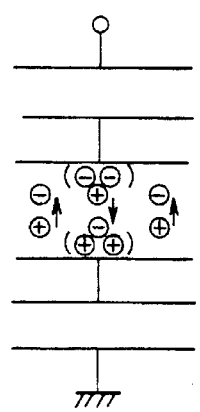
Figure 5C:
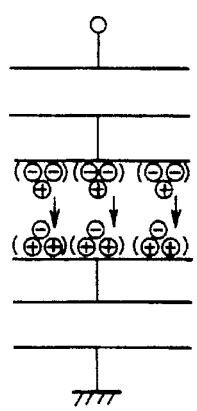
Figures 6A, 6B, 6C:
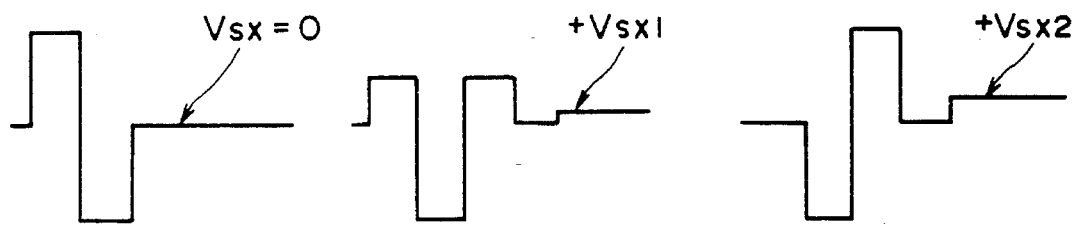
FIGS. 6A to 6C are waveform charts of drive signals used in the present invention.
Figure 18A:
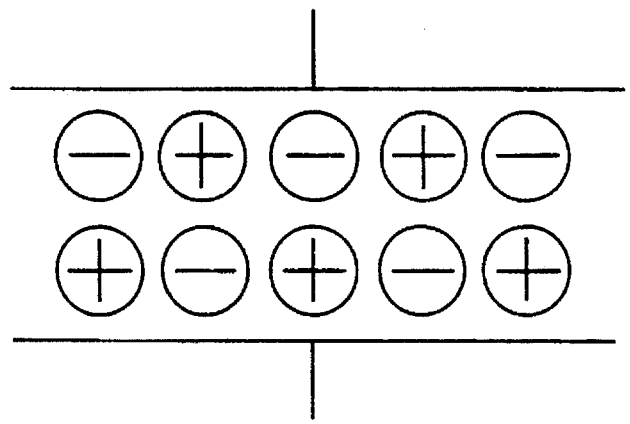
FIGS. 18A and 18B and FIGS. 19A and 19B are views showing polarization states of the cell of the present invention.
Figure 18B:
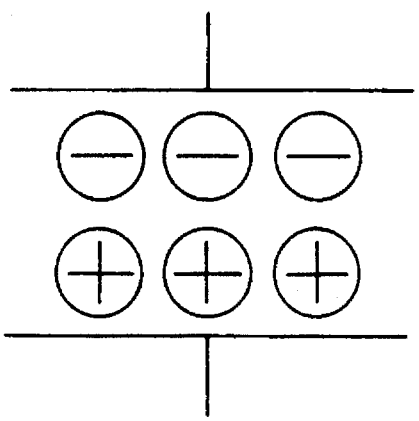
Figure 19A:
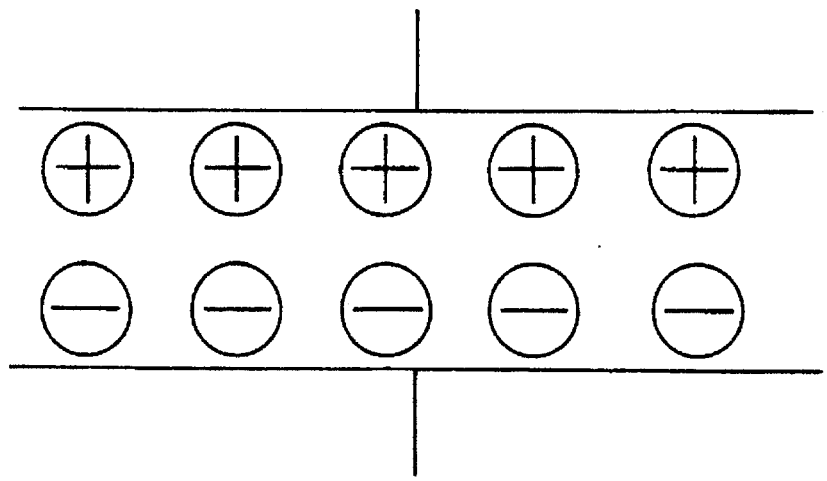
Figure 19B:
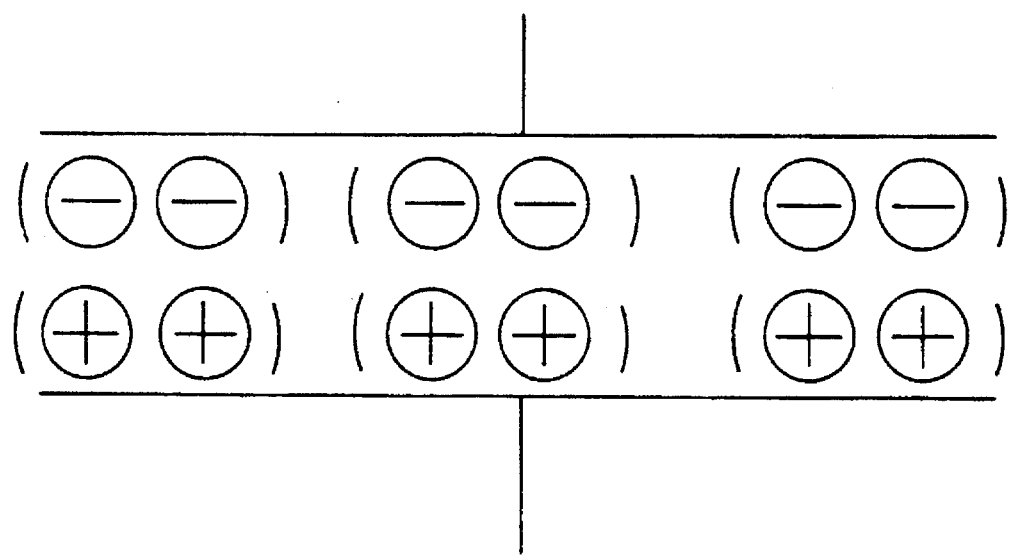

The ionic localization state of the "black" state shown in FIG. 5A is taken as an initial state. In this case, a drive signal having a waveform shown in FIG. 1(a) is applied to the liquid crystal in advance. In order to display the "black" state from this state, a drive signal having a waveform shown in FIG. 6A is applied to obtain the "black" state. At this time, the superposition amount of the DC component by the auxiliary voltage $V_{SX}$ may be zero. In order to display a gradation state, as shown in FIG. 5B, the ionic localization state to be obtained by this display is as shown in FIG. 18A. In order to keep the total ionic localization amount constant in the "black" display state, an auxiliary voltage $+V_{SX1}$ shown in FIG. 6B is applied to add the ionic localization of FIG. 18B. In order to obtain a "white" state, as shown in FIG. 6C, an auxiliary voltage $+V_{SX2}$ (FIG. 6C) is applied to maintain the state of FIG. 19A (i.e., the ionic localization state formed by this display) to the total amount obtained in the case of the "black" display.

The numerical control of the auxiliary voltages $V_{SX1}$ and $V_{SX2}$ is appropriately performed in accordance with the magnitude of the instantaneous polarization $P_S$ and the ambient temperature. It is advantageous if the magnitude of the spontaneous polarization $P_S$ is set not so large (i.e., 10 nC/cm² or less, and preferably 5 nC/cm² or less) in the liquid crystal used in the present invention since then an excessive increase in the amplitude of the auxiliary voltage signal $V_{SX}$ can be suppressed. The numerical value for the amplitude of the signal $V_{SX1}$ preferably falls within the following range:

$$V_{SX} \text{ to } \frac{2P_S \Delta a}{Ci}$$

(where $\Delta a$ is the gradation at the end of application of the voltage $V_W$ and satisfies condition $0 < \Delta a < 1$, and Ci is the capacitance of the insulating layer)

Figure 7:
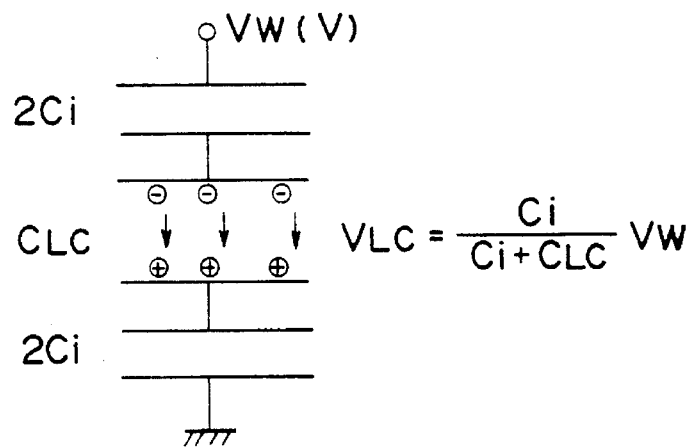
FIG. 7 is an equivalent circuit diagram showing a polarization state in the cell used in the present invention.

The criterion for this numeric value will be described below with reference to FIG. 7. FIG. 7 shows a measurement of a divided voltage applied to a liquid crystal layer when a terminal voltage of a liquid crystal pixel is set at 0 V immediately after a gradation recording voltage $V_W$ is applied. At this time, the liquid crystal molecules are partially returned to the "black" direction and are set in the gradation state. If the ratio of the "white" state is defined as $Aa$, the divided voltage of the liquid crystal layer is given as follows:

$$\frac{-2P_S \Delta a}{Ci + C_{LC}}$$

Since a voltage which causes movement of ions in this gradation state is given by the above relation, if an external reverse voltage $V_{SX}$ of the voltage which causes this movement of ions is applied and the divided voltage of the liquid crystal $$\frac{C_i}{Ci + C_{LC}} V_{SX}$$

by the voltage $V_{SX}$ is set to equal to $$\frac{-2P_S \Delta a}{Ci + C_{LC}},$$

movement of ions is assumed not to occur. Therefore, the following equation is established:

$$\frac{Ci}{Ci + C_{LC}} V_{SX} = \frac{2P_S \Delta a}{Ci + C_{LC}}$$

and the solution can be obtained as follows:

$$V_{SX} = \frac{2P_S \Delta a}{Ci}$$

For example, if $P_S$ and Ci are 5 20 nF and 20 nF/cm², respectively, the voltage $V_{SX}$=about 0.5 V can be obtained even in the full "white" state.

When the voltage $V_{SX}$ is applied within the range of 0 V to 0.5 V with the waveform shown in FIG. 8 in accordance with the gradation state, the initial ionic localization state can be maintained constant.

When the voltage $V_{SX}$ corresponding to the gradation state of each frame is kept applied as a DC component until the next frame in image display repetition, ionic localization can be kept constant. Therefore, instability which may be caused by ionic localization can be eliminated.

Second, since the DC component also serves as a "white" retention voltage of the liquid crystal, high-speed response of the liquid crystal can be obtained and can cope with the motion picture.

Figure 10B:
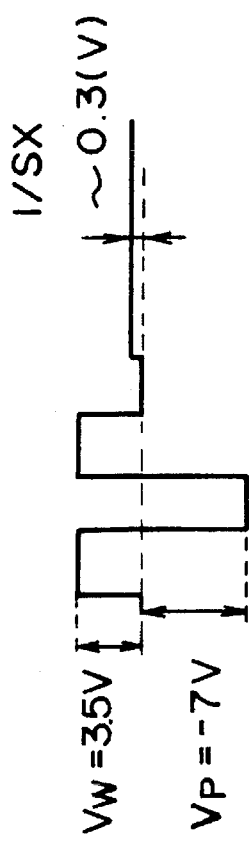
FIGS. 10 and 11, consisting of FIGS. 10(a) and (b) and 11(a)–(f), are views showing changes in response time upon continuous application of a DC component of about 0.3 V as $V_{SX}$ at a 44-Hz period.
Figure 10A:
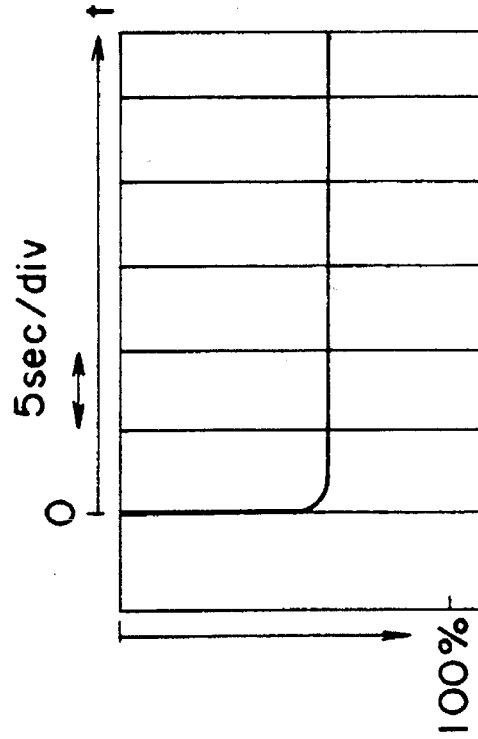
Figure 11A:
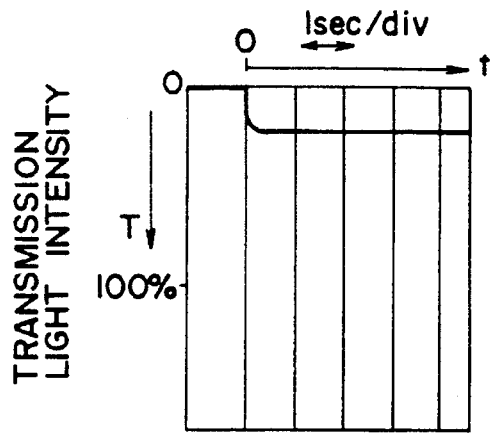
Figure 11D:
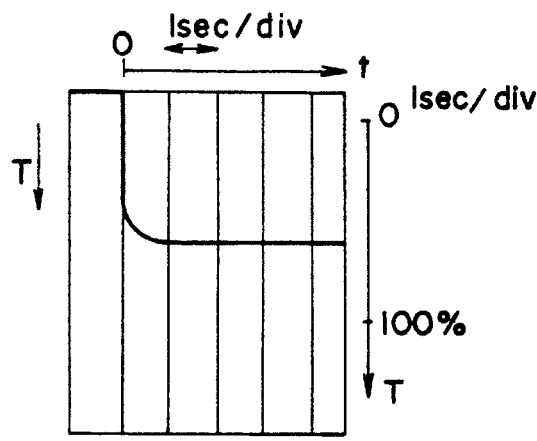
Figure 11B:
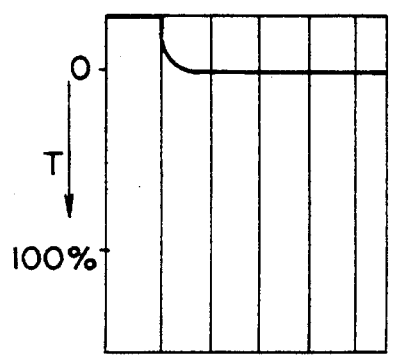
Figure 11E:
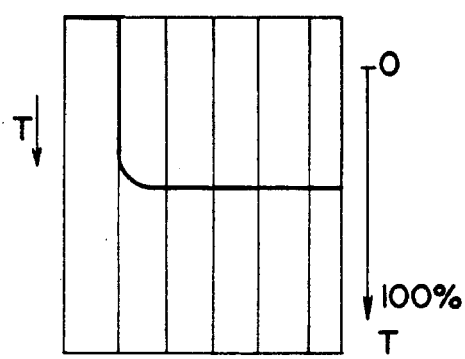
Figure 11C:
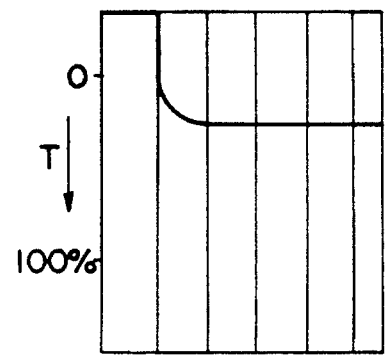
Figure 11F:
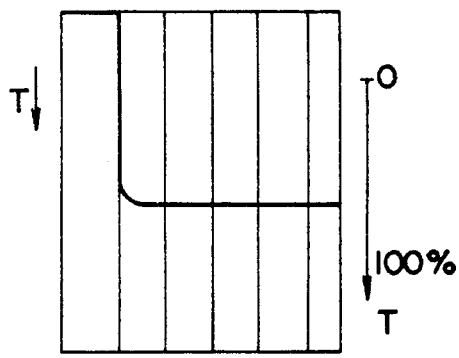

FIGS. 10 and 11 show an optical response test improved by the above driving method.

As described above, in order to stabilize the ionic localization state caused by a display state, the peak value $$V_{SX} = \frac{2P_S \Delta a}{Ci}$$

of the auxiliary voltage is preferably stabilized. According to this driving method, the maximum value of the voltage $V_{SX}$ is preferably set as follows:

$$V_{SXMAX} = \frac{2P_S \times 1}{Ci} \, Vth$$

The present invention proposes the optical element on the basis of the findings that the above condition must be essentially satisfied to balance the ions.

Figure 23:
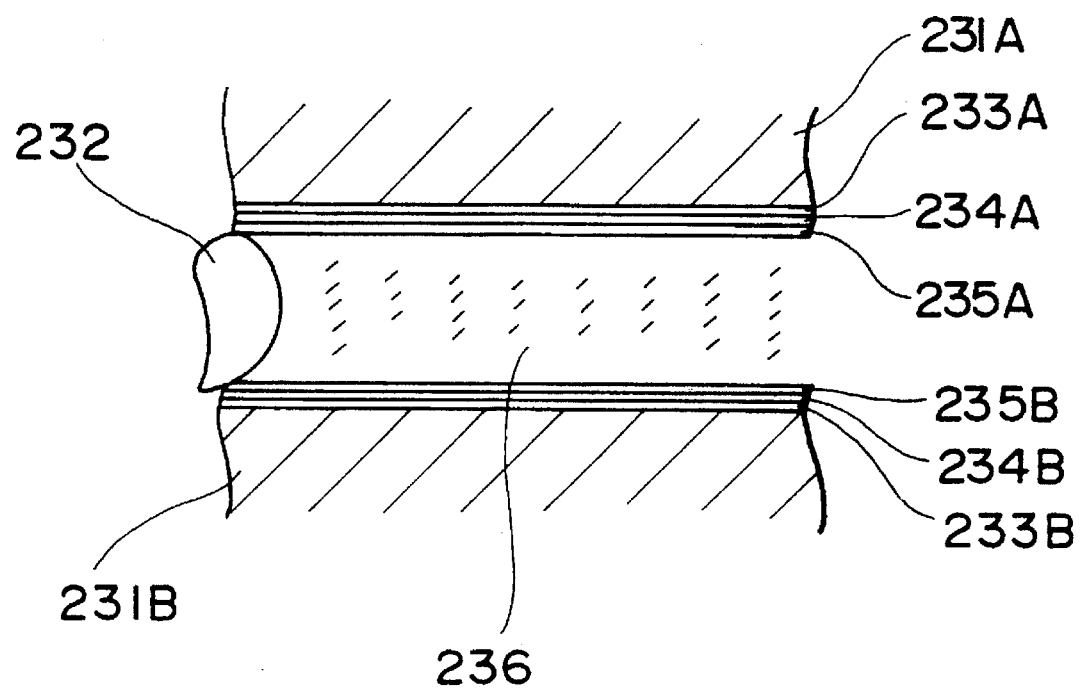
FIG. 23 is a sectional view of a cell of the present invention.

As a condition of a liquid crystal element structure shown in FIG. 23, the effective magnitude of the spontaneous polarization $P_S$ of the liquid crystal used and the composite capacitance Ci of the alignment layers as important components constituting the element or an insulating layer portion including an additional insulating layer in the element must satisfy the above permanent relationship, thereby performing substantially stable gradation driving.

From the qualitative viewpoint, the composite capacitance Ci is preferably set to be large, and the spontaneous polarization value $P_S$ of the liquid crystal used is preferably set to be small.

In an experiment conducted by the present inventors, insulating layers formed to prevent electrical short-circuiting of the upper and lower electrodes of each cell are formed such that an oxide mixture (Ti—SiO$_x$) of Ti (titanium) and Si (silicon) is coated on the electrodes and baked to obtain thin films each having a thickness of about 1,000 Å. A 200 Å thick polyimide alignment layer is formed on this insulating film and baked. The resultant structure is rubbed to maximize the composite capacitance Ci. In this case, the capacitance Ci can be about several 10 nF/cm². In order to further increase the capacitance Ci, the physical film thickness must be decreased, and a layer having a high dielectric constant is selected.

The magnitude of the spontaneous polarization $P_S$ of the liquid crystal is a maximum of 10 nC/cm² when it is evaluated by a polarization reverse current. This magnitude is preferably 5 nC/cm² or less. As a result, the value 2 $P_S$/Ci is set to be about 0.5 V or less. In order to increase the value Vth, the viscosity of the liquid crystal is adjusted. However, it is generally disadvantageous to increase the drive voltage.

In this case, the voltage Vth is defined as a DC application voltage limit with which an optical change is substantially not detected during a period of gradation display in driving the element.

A driving method of the element will be described below.

The above driving method cannot control each gradation level in formation of an image by a simple matrix. However, in principle, this driving method can be applied to an arrangement for driving pixels independently of each other as in driving of a single-bit optical shutter or a 7-segment display, or as in active matrix driving of TFTs (Thin Film Transistors).

Actual drive waveforms in TFT active matrix driving will be described in detail below.

Figure 12:
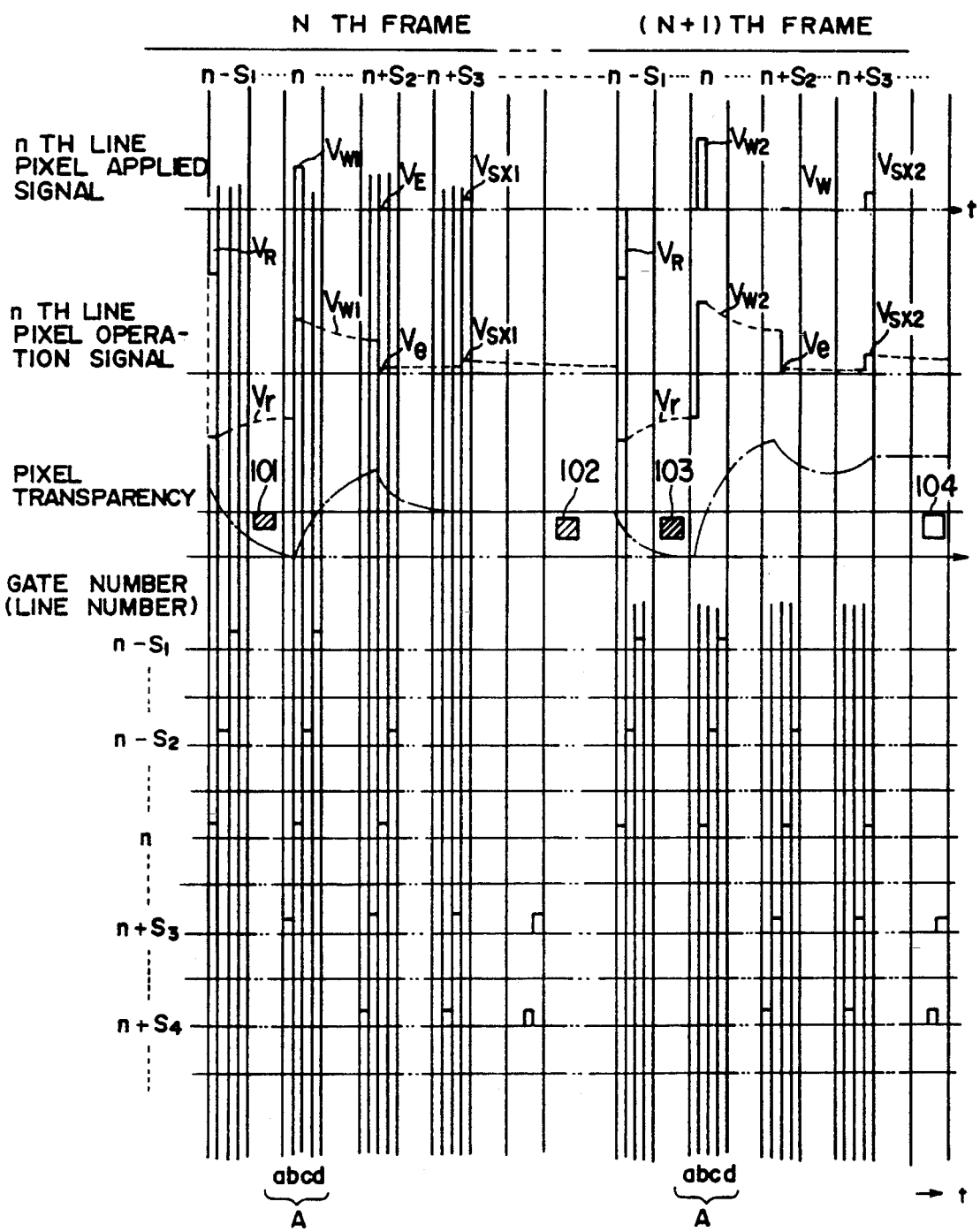
FIGS. 12 and 13 are waveform charts showing drive signals used in the present invention.

FIG. 12 is a timing chart showing drive waveforms when the present invention is applied to active matrix driving.

A reset signal $V_R$ for setting a pixel in the "black" state is applied, and a time voltage for sufficiently setting the pixel in the "black" state by utilizing the open characteristics of the TFT is also applied (Vr in FIG. 12). A recording voltage $V_W$ is applied, and this gradation level voltage $V_W$ is kept applied for a predetermined period of time in accordance with similar open characteristics. A ground signal $V_E$ is then applied to the pixel. During application of a ground voltage $V_e$, the gradation transmittance is changed but can be stabilized by the following auxiliary signal.

The auxiliary voltage signal $V_{SX}$ is then applied to the pixel. This signal can be selected from $V_{SX1}$ and $V_{SX2}$ in accordance with a desired gradation display state. As indicated by the voltages $V_{SX1}$ and $V_{SX2}$ in the display frame serving as one vertical scanning period in the gradation transmitting state, the auxiliary voltage signal is applied as a voltage value containing an appropriate DC voltage. Note that when a sufficiently high voltage is applied as the reset voltage, the voltages $V_{SX1}$ and $V_{SX2}$ may be applied as values added with voltages for effecting the DC components corresponding to the gradation levels after the voltage difference between the voltages Vr and $V_W$ is compensated to be zero during the frame period.

The target DC component value of this auxiliary voltage signal $V_{SX}$ is selected in accordance with the magnitude of the spontaneous polarization $P_S$ of the liquid crystal used. The target magnitude of the DC component value is given as $$V_{DC} = \frac{2P_S \times \Delta a}{C_i}$$

in accordance with the ratio $\Delta a$ of the "white" state when the maximum transmittance is defined as "1". For example, if PS to 5 nC/cm², and the capacitance of the insulating layers constituting the liquid crystal cell is about 20 nF/cm², the voltage $V_W$ for recording the full "White" state is set to be about 0.5 V. In the gradation display state, a DC component of about 0.5 V or less is superposed on the auxiliary voltage signal.

The recording voltage $V_W$ or the recording voltage signal $V_w$ is a signal for determining the optical state of each pixel and represents a voltage signal (gradation voltage signal) corresponding to display brightness of the pixel. The auxiliary voltage $V_{SX}$ or the auxiliary voltage signal $V_{SX}$ is assumed to be a voltage for substantially stabilizing the gradation display state. This voltage signal is stabilized well at a DC voltage equal to or less than the optical threshold value Vth. In this case, the optical threshold value Vth is defined as a value with which an optical change is substantially not detected even if the threshold value Vth is kept applied throughout one frame.

The absolute value of the auxiliary voltage signal $V_{SX}$ is preferably set to be about 1/50 to 1/5 that of the gradation voltage signal.

Referring to FIG. 12, the application interval of the ground voltage $V_e$ between the voltages $V_W$ and $V_{SX}$ is given to stabilize a reaction component as response of the liquid crystal molecules after the gradation voltage signal $V_W$ is applied. However, even if this application interval is not provided in this element, the driving effect is not impaired in this embodiment. In this case, the $V_{SX}$ value must be appropriately regulated in accordance with a drive waveform.

If a change in state of the liquid crystal is assumed to occur by the application interval of the reset voltage signal Vr, the application intervals of the voltage signals $V_W$ and $V_E$ can be set equal to that of the reset voltage Vr.

In order to effectively practice the above driving method, a recording period of each line is divided into at least four intervals (if the $V_E$ application interval is not provided, only three intervals are required; and the following description exemplifies a case wherein the $V_E$ application interval is provided). Referring to FIG. 12, the lower timing chart represents a case wherein the recording period A of the nth line is divided into four intervals. That is, the recording period A is divided into a division interval a for enabling a gate corresponding to a subsequent line a few lines after the current line to reset the pixels of the subsequent line, a division interval b for enabling a gate of the nth line to perform recording of the nth line itself, a division interval c for enabling a gate corresponding to a previous line a few lines before the current line to apply the ground voltage to the recorded pixels of the previous line, and a division interval d for enabling a gate corresponding to another previous line a few lines before the above previous line to apply an auxiliary voltage signal to the recorded pixels of this other previous line. Note that the division intervals a, b, c, and d in the recording period A of the nth line may have any one of the following orders: abcd, abdc, acdb, acbd, bacd, badc, bcad, bcda, bdac, bdca, cabd, . . .

FIG. 12 shows optical states 101 to 104 of a liquid crystal pixel of the nth line. These states are enlarged in FIG. 13.

Figure 14:
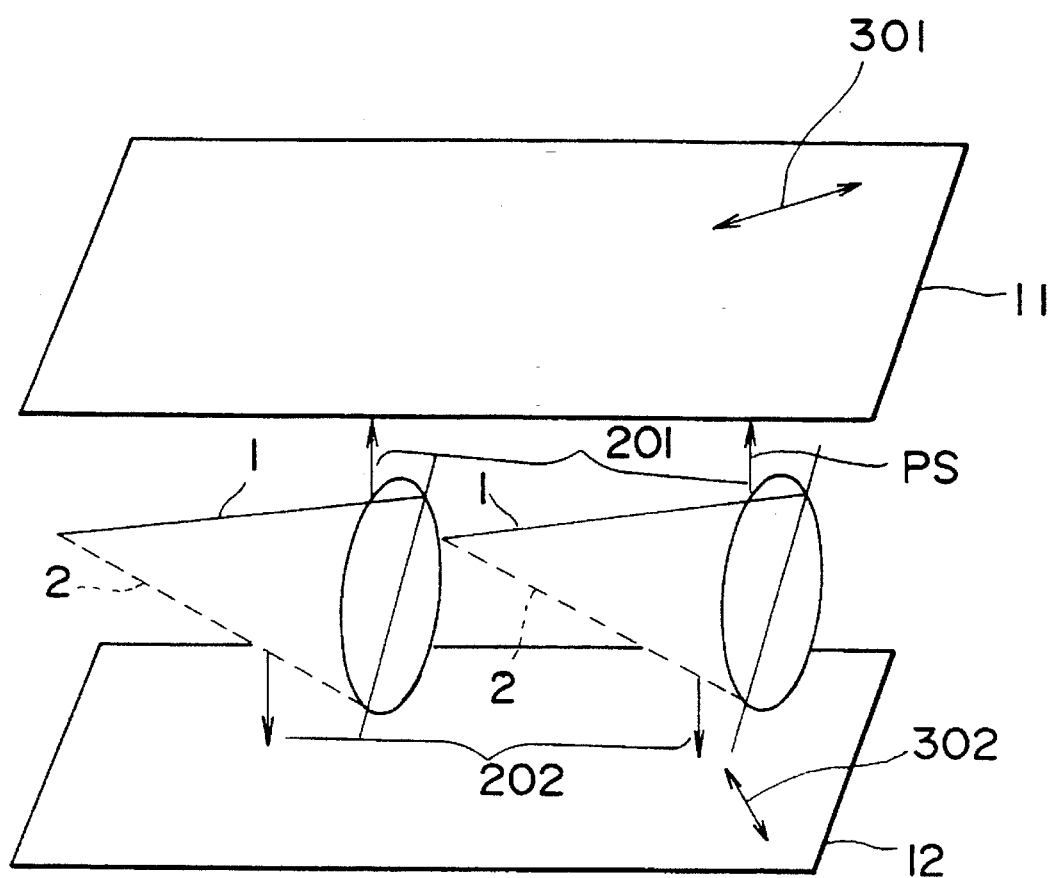
FIG. 14 is a perspective view of the FLC.

FIG. 14 is a view showing an FLC sandwiched between an upper electrode substrate 11 having a TFT active matrix and a lower substrate with its entire surface serving as an electrode.

Figure 20A:
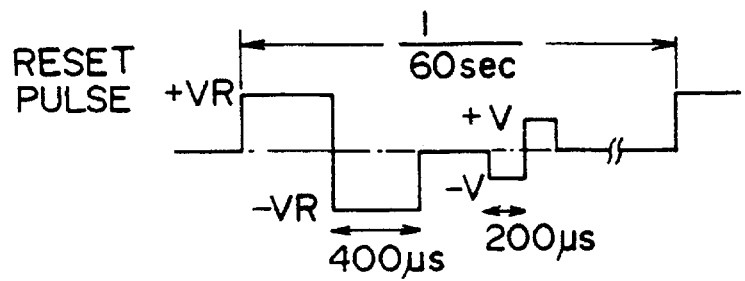
FIG. 20, consisting of FIGS. 20(a) and (b), is a graph for explaining a V-T curve and hysteresis instability obtained upon continuous voltage application at a 60-Hz period.
Figure 20B:
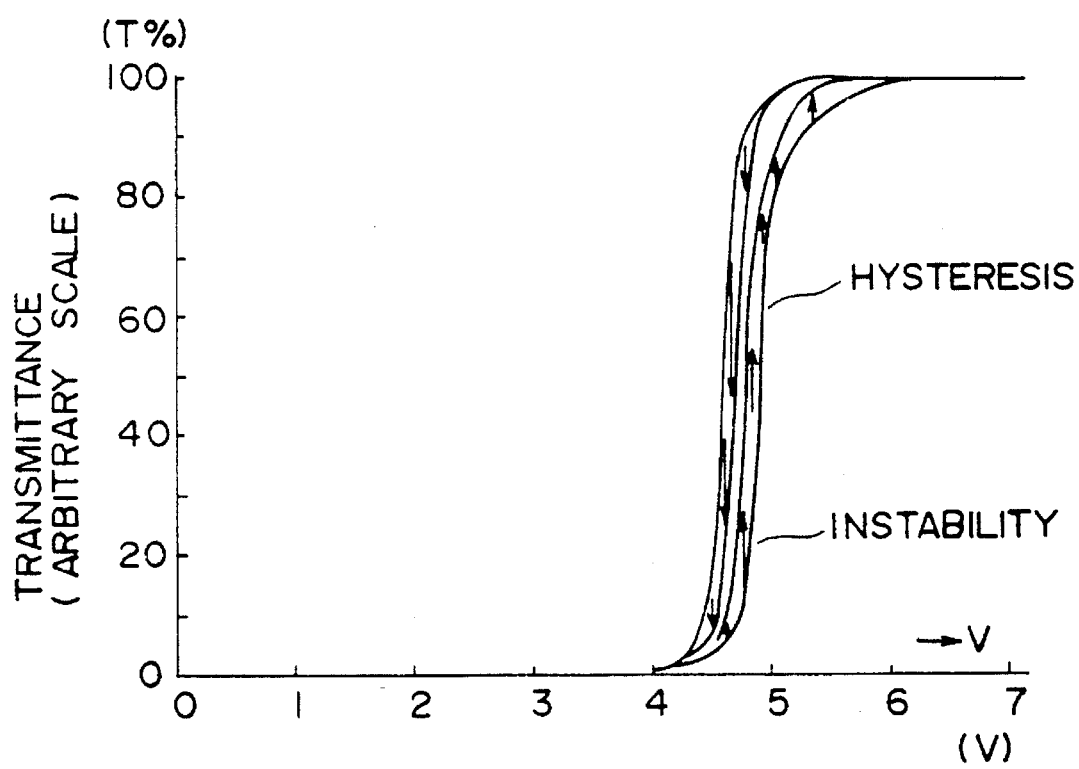

In principle, when the direction of the spontaneous polarization $P_S$ is upward 201, the major axis of each FLC molecule is given as a direction indicated by a solid line 1; and when the direction of the spontaneous polarization $P_S$ is downward 202, the major axis of each FLC molecule is given as a direction indicated by a dotted line 2. When the reset voltage Vr shown in FIG. 20 is applied to keep the upper electrode in a negative state, the spontaneous polarization is ideally directed in the upward direction 201 during this interval. When one of polarizing plates 301 and 302 arranged as a crossed polarizer is aligned with the major-axis direction indicated by the solid line 1, the pixel is set in the "black" state. Therefore, full "black" states 101 and 103 in FIG. 12 can be obtained.

When the gradation voltage signal as the recording voltage signal $V_W$ has a magnitude larger than the reverse threshold value Vth of the liquid crystal, a "white" domain is formed. However, if $V_W$ is less than Vth, a reset "black" state is maintained. When the ground voltage signal $V_E$ is enabled to apply the ground voltage $V_e$, some molecules which are not latched to the "white" state tend to react, but the state is transited to the gradation display state (103 in FIG. 12) corresponding to the gradation voltage $V_W$. Thereafter, when the auxiliary voltage signal $V_{SX}$ corresponding to the voltage $V_W$ is applied, the gradation state is maintained, and variations in ionic localization described above can be prevented. As a result, since the variations in ionic polarization are eliminated in each frame, no undesirable change in transmittance occurs. Therefore, a stable image display operation can be performed.

In a so-called high-vision compatible television display, when about 1,000 scanning lines are interlaced-scanned at 30 or 60 Hz, each frame is driven for about 33 msec. For this reason, a recording period assigned to each line is about 33 μsec per frame. The recording period of 33 μsec for applying a recording voltage every nth line according to the present invention is divided into four intervals (i.e., each interval is about 8 μsec or less). For example, these four intervals consist of an interval for applying the VR pulse for resetting a line pixel applied with the recording voltage ($V_W$) six lines after the current line (=$S_3$), a recording pulse interval for applying the voltage $V_W$ to the pixel of the nth line, a ground signal interval for applying the ground voltage $V_E$ to a line pixel having been applied with the voltage $V_W$ six lines before the current line (=$S_2$), and an interval for applying the auxiliary voltage signal $V_{SX}$ to a line pixel having been applied with the $V_W$ 12 lines before the current line (=$S_1$). A total time for applying the respective voltages becomes about 198 μsec (=about 33 μsec×6). A satisfactory image display could be obtained by the material used by the present inventor at maximum $V_R$ and $V_W$ voltages of about 7 V. In addition, the DC component was superposed on the auxiliary voltage $V_{SX}$ by a voltage equal to or less than the threshold value Vth corresponding to the gradation level to stabilize the gradation display state.

Figure 13:
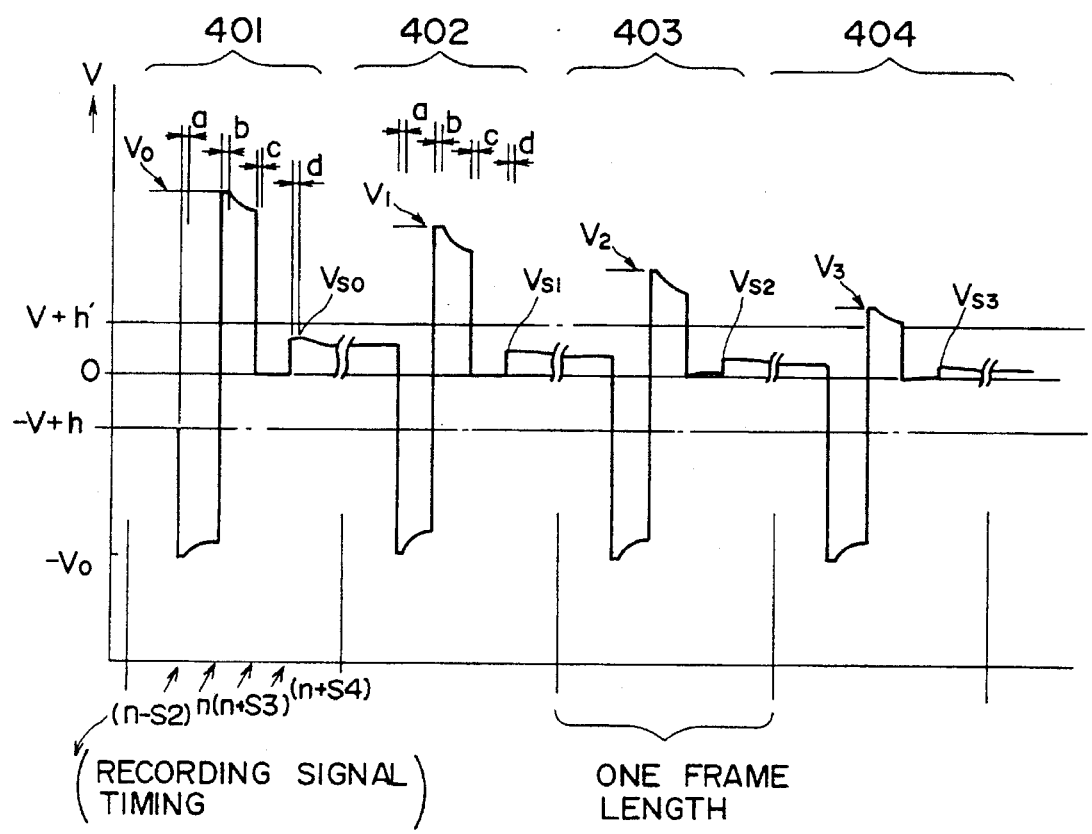

The driving method shown in FIG. 12 will be described in more detail with reference to FIG. 13.

The pulse peak value of the auxiliary voltage signal $V_{SX}$ can be determined as follows.

Assume that the peak value $V_R$ of the reset voltage Vr in the ideal voltage waveform during the reset signal interval a is $-V_0$, and that the peak value $V_W$ of the recording voltage $V_W$ during the recording signal interval b is $+V_0$. If the times for applying these voltages are equal to each other, a peak value $V_{S0}$ of the auxiliary voltage signal $V_{SX}$ during the auxiliary voltage signal interval d is set at 0.5 V if ps to 5 nC/cm² and Ci to 20 nF/cm², in accordance with calculation $$\frac{2P_S(\Delta a = 1)}{Ci}$$

(interval 401).

On the other hand, when gradation levels are assigned to the recording signal as indicated by intervals 402, 403, and 404, peak values $V_{S1}$, $V_{S2}$, and $V_{S3}$ are defined as follows if the reset voltage is sufficiently high, the number of scanning lines is 1,000, and a 24-line period is provided as the frame interval (blanking period) as follows. If the reset interval, the recording interval, and the ground interval are defined as $S_2$, $S_3$, and ($S_4-S_3$), respectively, and if condition $S_2=S_3=(S_4-S_3)=S$ is established, the following equations can be approximated:

$$V_{S1}' = \frac{(V_0 - V_1) \times S}{1024 - (3S + 1)}$$

$$V_{S2}' = \frac{(V_0 - V_2) \times S}{1024 - (3S + 1)}$$

-continued $$V_{S3}' = \frac{(V_0 - V_3) \times S}{1024 - (3S + 1)}$$

When the DC components by the voltages Vr and $V_W$ are set to zero, and a voltage value corresponding to $$\frac{2P_S\Delta a \ (0 < \Delta a < 1)}{Ci}$$

is added to each zero DC component value, so that the peak values of the auxiliary voltage signals are defined with respect to gradation values (based on transmittances at the end of ground voltage application period) $\Delta a_1$, $\Delta a_2$, and $\Delta a_3$ as follows:

$$V_{S1} = V_{S1}' + \frac{2P_S\Delta a1}{Ci}$$

$$V_{S2} = V_{S2}' + \frac{2P_S\Delta a2}{Ci}$$

$$V_{S3} = V_{S3}' + \frac{2P_S\Delta a3}{Ci}$$

$(0 < \Delta a1, \Delta a2, \Delta a3 < 1)$

If the intervals $S_2$, $S_3$, and ($S_4-S_3$) are different from each other, the voltage $V_{S1}'$ can be rewritten as follows:

$$V_{S1}' = \frac{(V_0 \times S_2) - (V_1 \times S_3)}{1024 - \{S_2 + S_3 + (S_4 - S_3) + 1\}}$$

For example, assume that the spontaneous polarization $P_S$ of the FLC used equals 5 nc/cm², the capacitance Ci is 20 nF/cm², the voltage $V_W$ is $-7$ V, and a 60% transmittance is obtained at $V_1$ of 5.5 V. If the $S_2=S_3=(S_4-S_3)=6$, then the following equation is obtained:

$$V_{S1}' = \frac{7 \times 6 - 5.5 \times 6}{1024 - 19} = \frac{9}{1005} \approx 9 \text{ mV}$$

and therefore, $$V_{S1} = 9 \text{ (mV)} + 0.5 \text{ (V)} \times 0.6 = 0.309 \qquad \text{(V)}$$

The auxiliary voltage signal $V_{SX}$ may be calculated in accordance with the analog recording signal voltage $V_W$ on the spot, or may be automatically output from a prestored table T ($V_W$ and $V_{SX}$) if the recording signal $V_W$ is a digital signal.

The driving method of the present invention can be easily realized by arranging a frame memory or a line memory of at least $S_4$ lines in principle.

That is, since a delay time of $S_4=12$ lines is present between generation of the recording signal and generation of the auxiliary signal, information of $S_4=12$ lines must be stored for generation of recording signals for other lines during this period.

Figure 15:
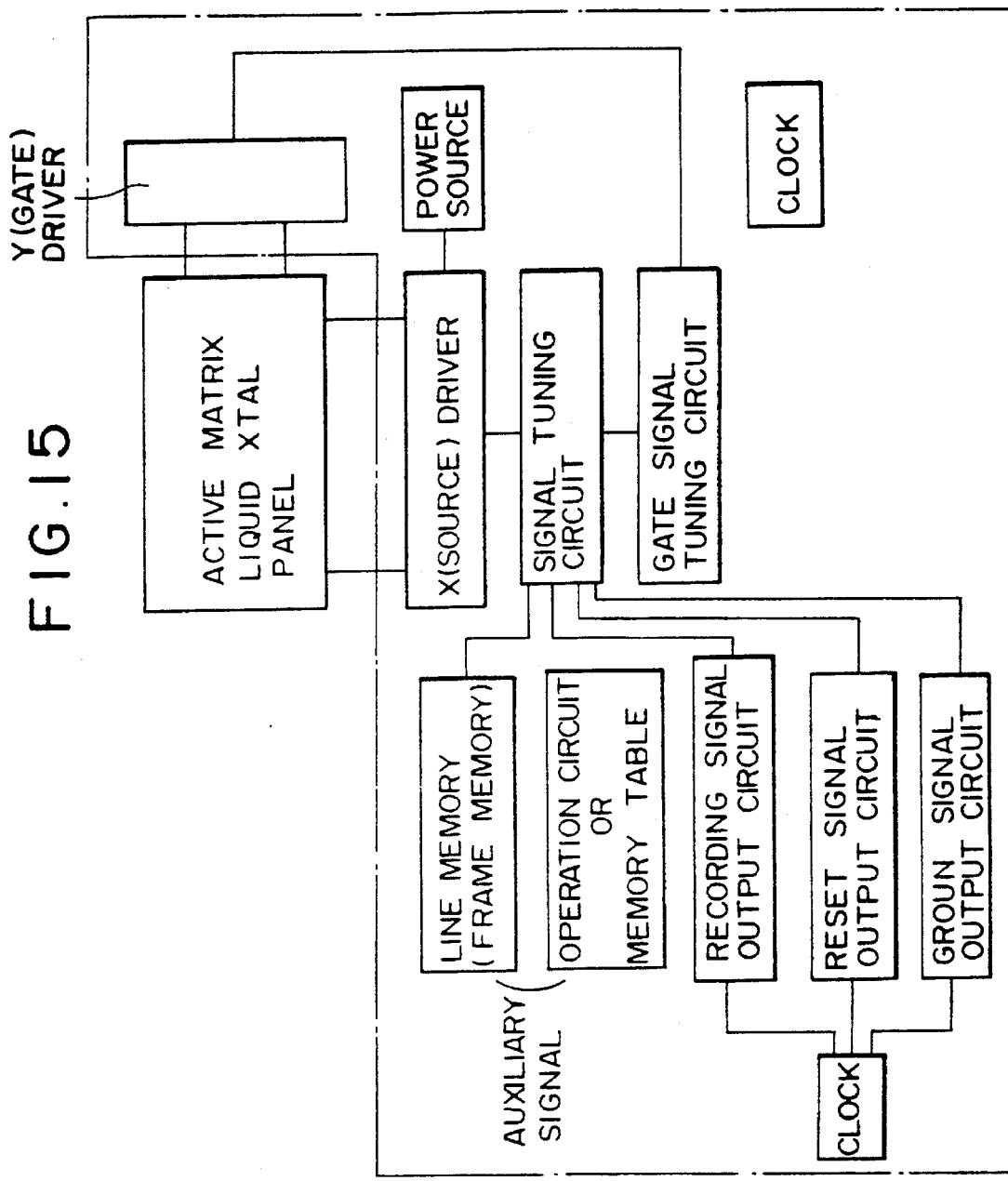
FIG. 15 is a block diagram of an apparatus according to the present invention.

FIG. 15 shows a simple block diagram of a driver circuit. All signal tuning operations are performed in response to a clock (shown in FIG. 15). Gate signal output timings of the lines, reset signals for the source electrodes, and recording and auxiliary signal output timings are controlled by this clock.

It is readily understood that a good effect can be obtained by a combination of a liquid crystal having spontaneous polarization and an active matrix element in order to apply the auxiliary voltage.

In the above description, the ionic localization state is stabilized when the FCL state is the full "black" state. However, this localization may be stabilized when the FCL state is a full "white" state.

Figure 16B:
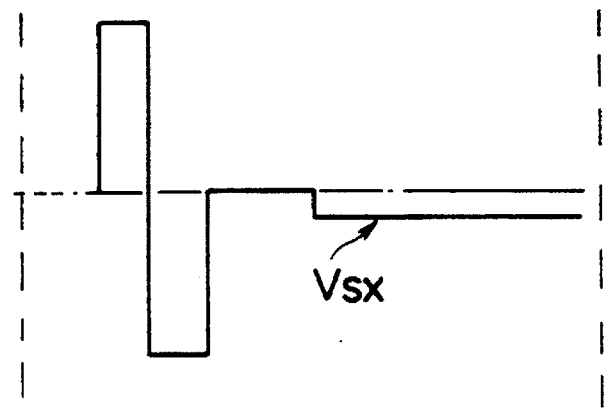
Figure 16B:
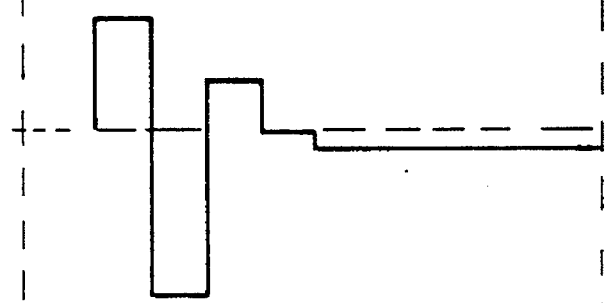
Figure 16C:
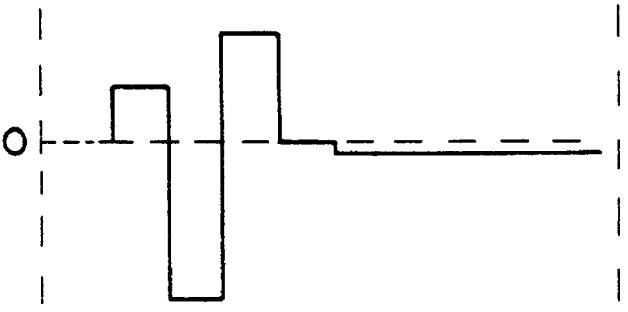
Figure 16D:
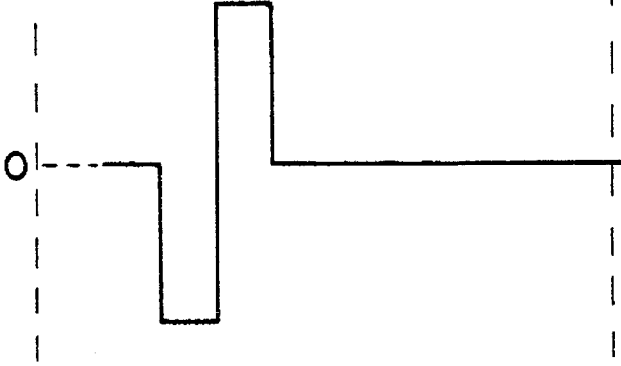

In this case, ionic localization in the initial "white" state is caused to occur to start the operation. According to this method, a waveform in FIG. 16(d) is continuously applied. The DC component source for maintaining the ionic localization in the "black" state is $$\frac{2P_S \Delta a}{Ci},$$

and this component is applied as the auxiliary signal. If the "white" domain ratio is given as $\Delta a$, in order to maintain the ionic localization amount in the "white" state with respect to the remaining black domain ratio $(1-\Delta a)$, an auxiliary voltage having the following DC component superposing amount is applied (FIGS. 16(a) to 16(d)):

$$\frac{-2P_S(1-\Delta a)}{Ci}$$

Figure 21A:
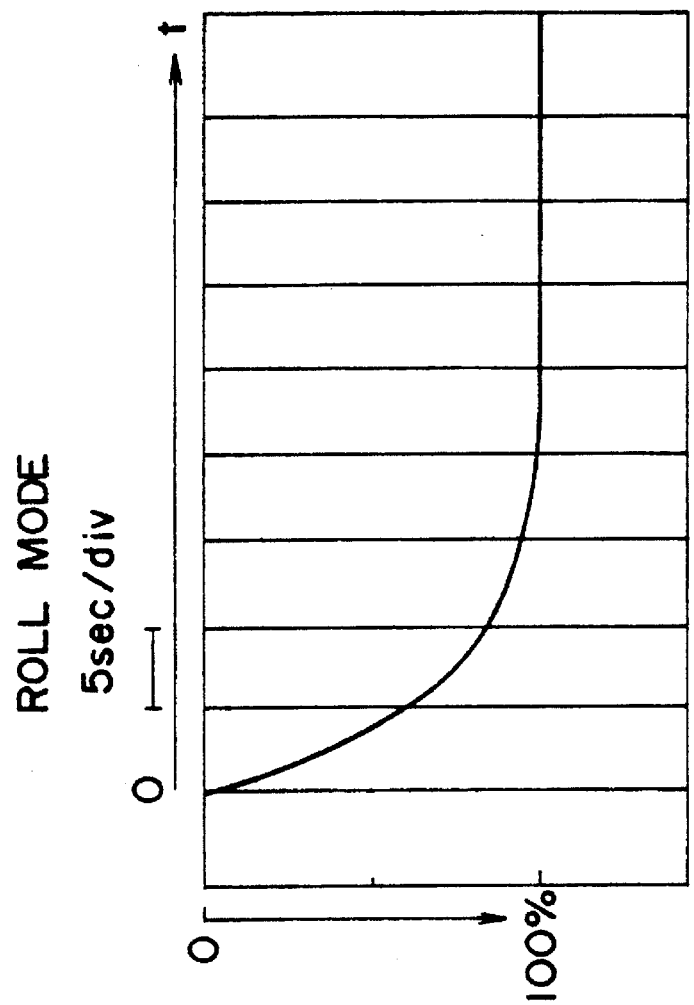
FIG. 21, consisting of FIGS. 21(a) and (b), is a graph for explaining instability exhibited upon continuous voltage application at a 44-Hz period.
Figure 21B:
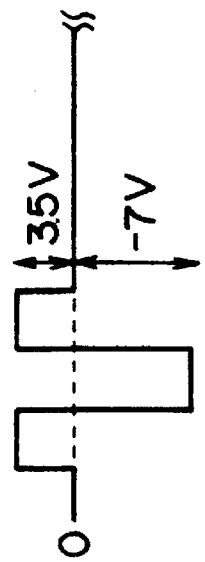
Figure 22A:
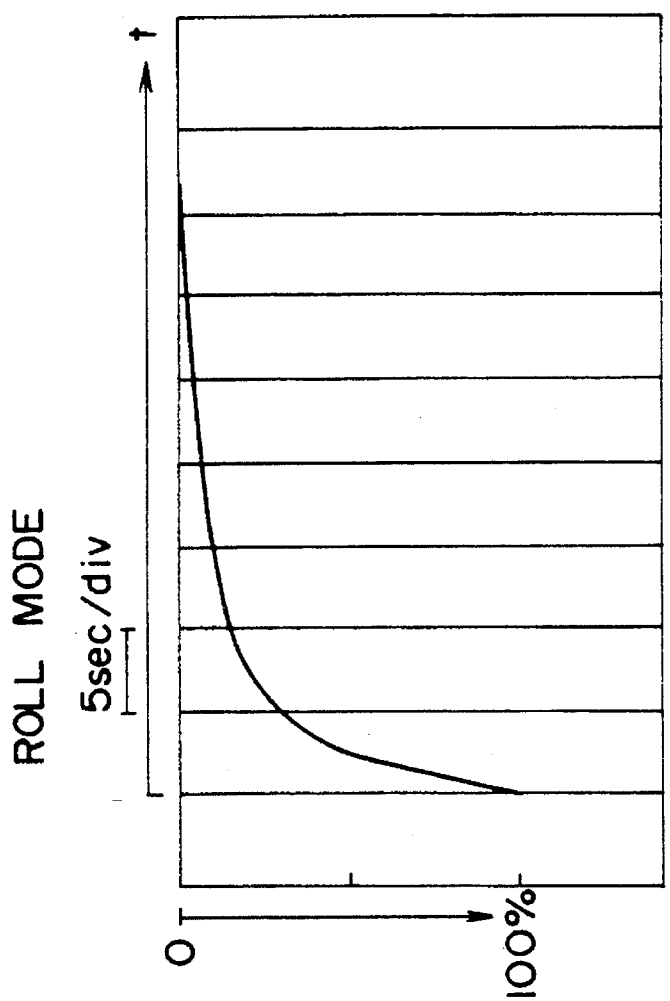
FIG. 22, consisting of FIGS. 22(a) and (b), is a graph for explaining a change in response deterioration over time upon continuous application of a 0.9 $V_a$ DC component at the 44-Hz period.
Figure 22B:
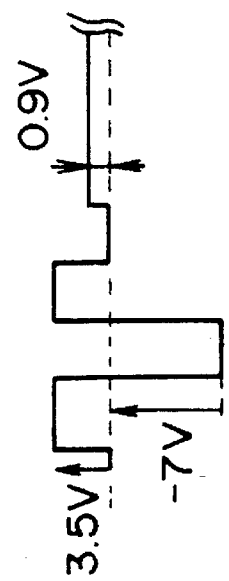

That is, when the present invention is applied to the active matrix driving, the auxiliary voltage signals are given as follows, as shown in FIG. 21:

$$V_{So} = 0$$

$$V_{S1} = V_{S1}' - \frac{2P_S(1-\Delta a1)}{Ci}$$

$$V_{S2} = V_{S2}' - \frac{2P_S(1-\Delta a2)}{Ci}$$

$$V_{S3} = V_{S3}' - \frac{2P_S(1-\Delta a3)}{Ci}$$

In this case, the correspondence between the recording voltage values $V_1$, $V_2$, and $V_3$ (FIG. 13) and the gradation values $\Delta a_1$, $\Delta a_2$, and $\Delta a_3$ is different from the case wherein the ionic localization is stabilized in the "black" state. A lower voltage is selected as the voltage $V_W$ to obtain good gradation display as in the above embodiment.

When the stabilized gradation display is achieved, the DC component value $$\frac{-2P_S(1-\Delta a)}{Ci}$$

is always smaller than Vth.

According to the optical modulation element, as has been described above, there is provided a good liquid crystal display. A high-precision direct viewing flat display or a projection display can be arranged. As a matter of course, by arranging a color filter on each pixel, or by using a plurality of liquid crystal elements of the driving method of the present invention so as to perform color light projection, a transmission or reflection type high-definition flat color television or projection color television can be arranged.

The present invention is not limited to the driving techniques in the above embodiment. The present invention is widely applicable as optical elements consisting of liquid crystals having spontaneous polarization to perform stable gradation display.

What is claimed is:

1. A liquid crystal element comprising a liquid crystal exhibiting spontaneous polarization, a pair of electrode substrates for sandwiching said liquid crystal therebetween, and insulating layers formed between said electrode substrates and said liquid crystal, wherein a spontaneous polarization $P_S$ value, in $nC/cm^2$, of said liquid crystal, an interelectrode composite capacitance Ci, in $nF/cm^2$, of said insulating layers, and a voltage threshold value Vth, in volts, of optical response of said liquid crystal in said liquid crystal element satisfy the following condition:

$$\frac{2P_s}{Ci} < Vth$$

2. An element according to claim 1, wherein said liquid crystal essentially consists of a ferroelectric liquid crystal.

* * * * *

UNITED STATES PATENT AND TRADEMARK OFFICE
CERTIFICATE OF CORRECTION

PATENT NO. : 5,479,283

DATED : December 26, 1995

INVENTOR(S): SHUZO KANEKO ET AL.

It is certified that error appears in the above-identified patent and that said Letters Patent is hereby corrected as shown below:

ON COVER PAGE

AT [54] TITLE,
      "THAN THE" should read --THAN TWO TIMES THE--.

IN THE DRAWINGS

SHEET 11 of 19,
      FIG. 15, "GROUN" should read --GROUND--.

COLUMN 1

Line 3, "THAN THE" should read --THAN TWO TIMES THE--.

UNITED STATES PATENT AND TRADEMARK OFFICE
CERTIFICATE OF CORRECTION

PATENT NO. : 5,479,283

DATED : December 26, 1995

INVENTOR(S): SHUZO KANEKO ET AL.       Page 2 of 2

It is certified that error appears in the above-identified patent and that said Letters Patent is hereby corrected as shown below:

<u>COLUMN 5</u>

Line 29, "Aa," should read --$\Delta$a,--.
  Line 65, "5 20 nf" should read --5 $nC/cm^2$--.

Signed and Sealed this

Second Day of July, 1996

Attest:

BRUCE LEHMAN

*Attesting Officer*       Commissioner of Patents and Trademarks